Figure 1:
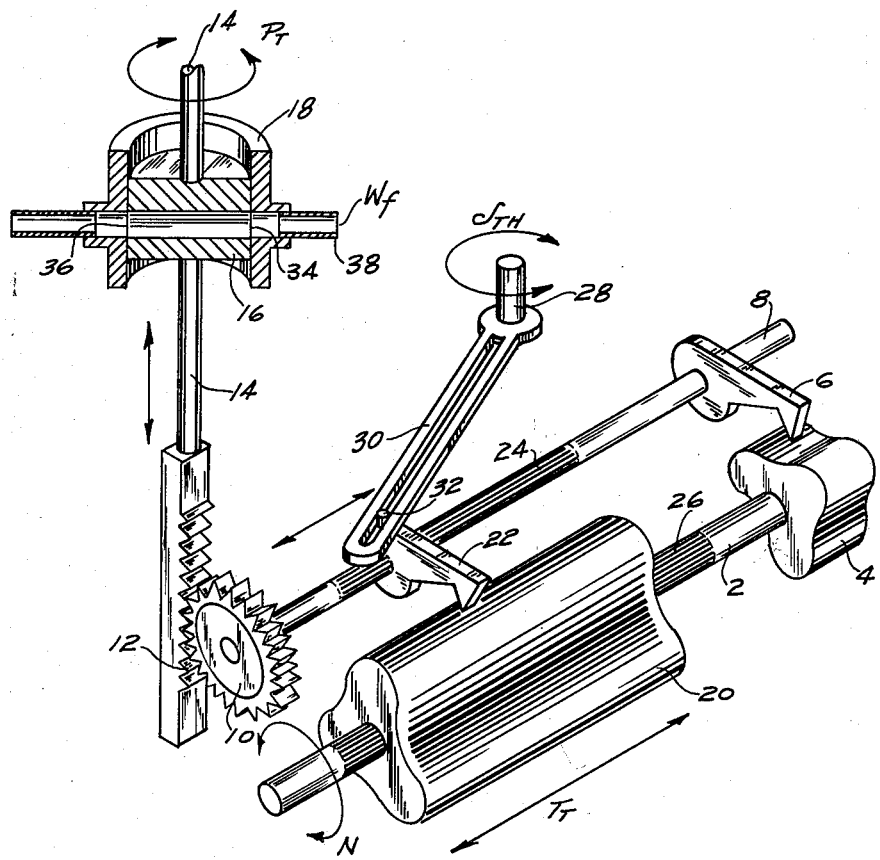

THOMAS C. DENNINGER
MARJORIE L. CARPENTER
INVENTORS

BY *Delbert P. Warner*

ATTORNEY

THOMAS C. DENNINGER
MARJORIE L. CARPENTER
INVENTORS

BY Delbert P. Warner
ATTORNEY

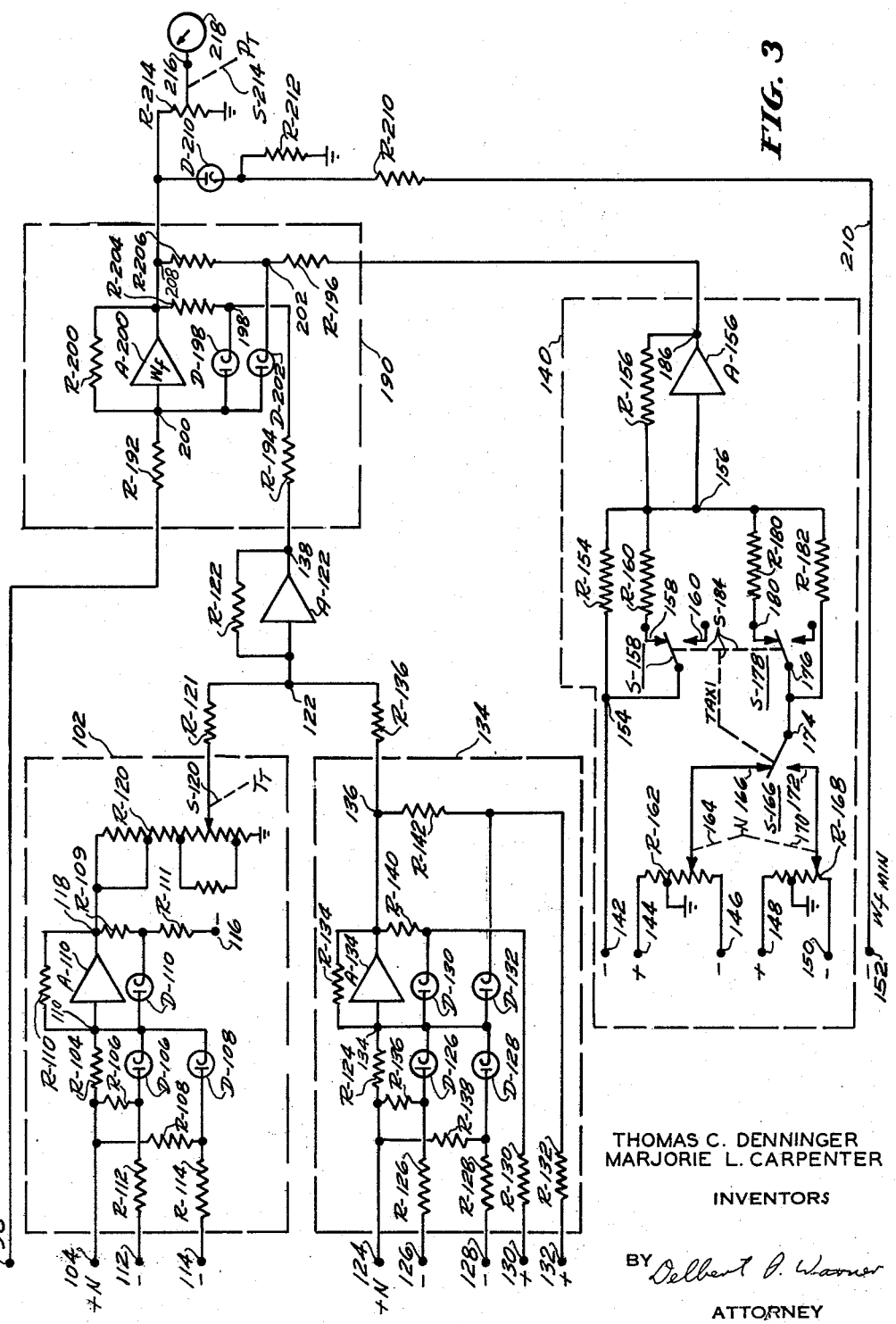

United States Patent Office 3,085,355
Patented Apr. 16, 1963

1

3,085,355
AIRCRAFT ENGINE FUEL CONTROL SIMULATOR
Marjorie L. Carpenter and Thomas C. Denninger, Binghampton, N.Y., assignors to General Precision, Inc., a corporation of Delaware
Filed July 8, 1959, Ser. No. 825,743
12 Claims. (Cl. 35—12)

The present invention relates to aircraft turbo-prop engine simulators and more particularly to the simulation of apparatus and the functions of apparatus for controlling fuel flow in such engines.

Turbo-prop or prop-jet engines, as well as turbo-jet engines and other heat engines, have certain characteristics which require fairly elaborate control systems in order to insure that the proper amount of fuel will be fed into the engine. In some turbo-prop engines, for example, fuel flow is regulated according to engine speed, throttle setting, inlet temperature at the compressor, acceleration, and inlet pressure at the compressor.

In order to provide suitable control of the flow of fuel in aircraft engines, elaborate mechanical systems are frequently employed involving three dimensional cams, cam followers and other mechanical linkages. Such systems are quite satisfactory in the control of engines, where positive supervisory control must be maintained at all times. The same or similar mechanical elements could be employed in aircraft engine simulators with suitable transducers. However, suitable mechanisms of this nature which are of sufficient sophistication to provide realistic outputs are generally overly expensive and elaborate for use in simulators or trainers.

The prior art devices dealing with the simulation of turbo-jet and prop-jet engines have not considered the question of simulating fuel control directly, but have depended upon throttle settings alone, or, at most, have provided means for taking one or two additional factors into consideration.

It is a primary object of this invention, therefore, to simulate a fuel regulator for a turbo-prop engine.

It is an additional object of this invention to simulate the changes in fuel flow brought about in a fuel regulator due to changes in the inlet temperature of a compressor.

It is another object of this invention to simulate the changes in fuel flow in a turbo-prop engine brought about in a fuel regulator due to changes in the throttle setting.

It is yet another object of this invention to simulate the changes in fuel flow in a turbo-prop engine as controlled by the fuel regulator in response to signals indicating the speed of revolution of the engine.

It is a further object of this invention to simulate changes in fuel flow brought about in a fuel regulator due to changes in the compressor inlet pressure.

It is still another object of this invention to simulate the changes in fuel flow in a turbo-prop engine attributable to the requirements of taxiing speeds as controlled by a fuel regulator.

Figure 2:
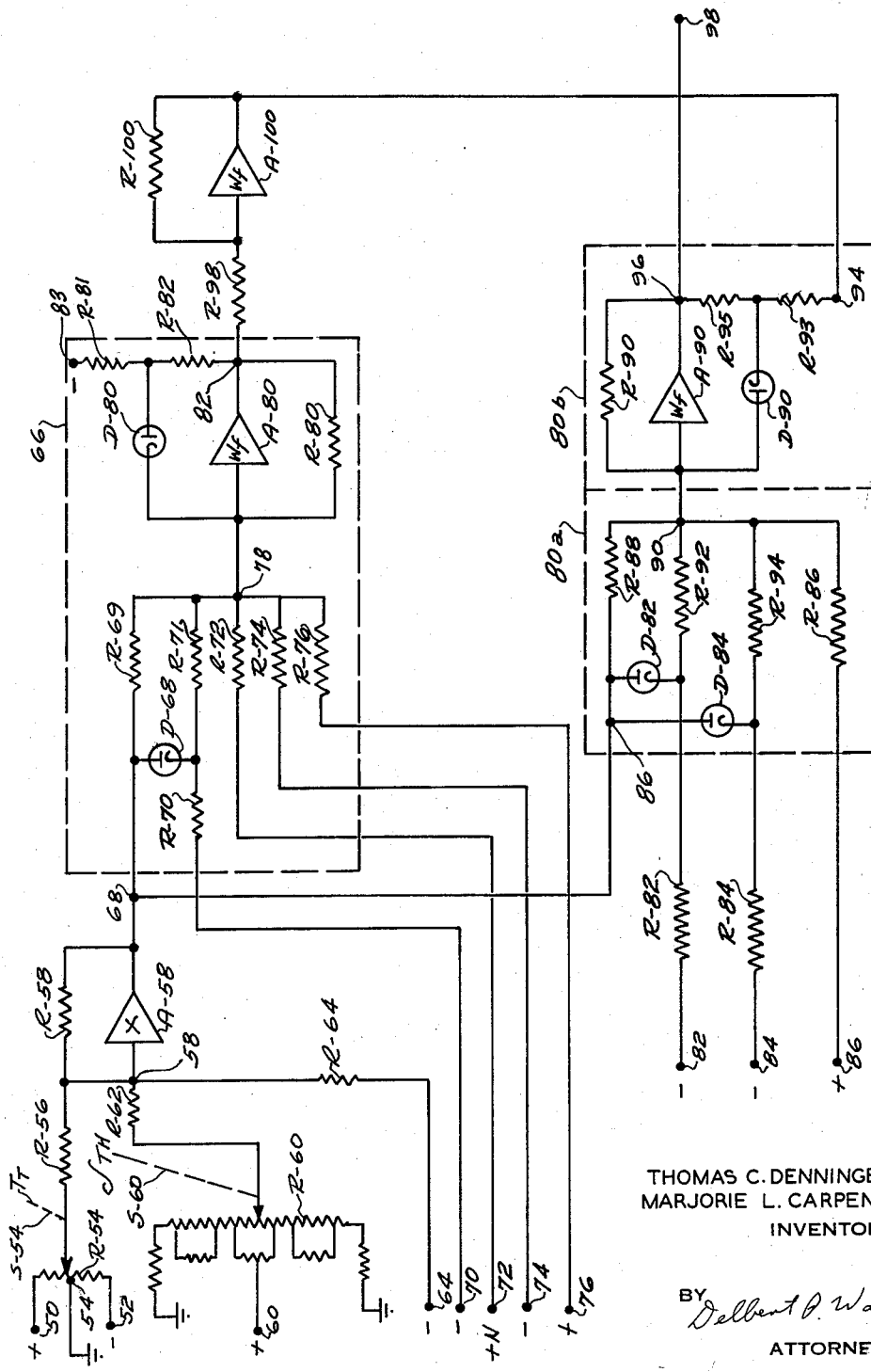

The novel features that we consider characteristic of our invention are set forth with particularly in the appended claims. The invention itself, however, both as to its organization and its method of operation, together with additional objects and advantages thereof, will best be understood from the following description of specific embodiments when read in connection with the accompanying drawings, in which:

FIG. 1 is a perspective view, partially in section, of a simplified version of a fuel control device usable in prop-jet engines, FIG. 2 is a schematic diagram illustrating a portion of a preferred embodiment of the invention, and FIG. 3 is a schematic diagram illustrating another portion of a preferred embodiment of the invention.

The instant invention, as previously indicated, concerns the simulation of a fuel control mechanism such as would be used in a turbo-prop engine. Fuel control regulators of this nature are designed to optimize the use of fuel in a turbo-prop engine and also to assure the safe operation of the engine by preventing flame-outs and the like.

In the instant invention, the simulation of the functions of a fuel control regulator is provided by a number of electronic analog computer elements. Among these elements are potentiometers, from which potentials may be derived representing the effect on fuel flow of such variables as temperature, throttle setting, and engine speed. In order to simulate some of the effects of three dimensional cams used in the fuel control regulators diode function generators are employed. In order to ascertain which of the functions involved will be used actually to regulate the pressure flow, comparator circuits in the form of diode function generators are utilized to determine which is the larger or smaller, as required in the particular instance, of a plurality of functions. The output of this fuel flow control simulator is then supplied to suitable meters and/or control elements in an aircraft simulator.

Turning first to FIG. 1 to determine the general nature of the operation of a fuel regulator for turbo-prop engines, we find a plurality of three dimensional cams and mechanical linkages to control a metering valve which in turn governs the flow of fuel. In an aircraft engine, a much more sophisticated version of the mechanism shown in FIG. 1 would be coupled to the engine and the controls thereof by suitable means. Aircraft engines, of course, are started by auxiliary motive means, and when a turbo-prop engine having a regulator like the regulator of FIG. 1 associated therewith first begins to function, the shaft 2 will be turned in synchronism therewith. The rotation of shaft 2 can be transmitted to a three dimensional cam 4, which may be designated as the acceleration cam, which in turn will operate the cam follower 6, which is keyed to the shaft 8, to turn the shaft 8 and the pinion gear 10 which is attached thereto.

The rotation of pinion gear 10 is translated via rack 12 to a shaft 14 which causes the inner portion 16 of the metering valve 18 to slide back and forth along the axis of the shaft 14 as indicated by the arrows in FIG. 1. As indicated by the curved arrow at the top of shaft 14, shaft 14 is journalled in the upper end of rack 12 in such a manner as to permit it to rotate about its longitudinal axes. The control of shaft 8 by acceleration cam 4 continues until a speed is reached such that the turbo-prop engine is self-operating. This speed is, of course, a function of the particular engine involved and is herein shown by the shaft position N. When this speed is attained, shaft 2 will position the three dimensional cam 20 to control the cam follower 22 which is coupled by splines 24 or other siutable means to the shaft 8 in such a way that it may slide longitudinally along the axis of shaft 8 but is coupled to rotate shaft 8 about its axis it is lifted above the position of cam follower 6. It will be observed that three-dimensional cam 20 is coupled to shaft 2 by splines or other sliding means 26 which will permit cam 20 to move along the axis of shaft 2 in accordance with variations in the inlet temperature to the compressor, but fixes it securely about the axis of shaft 2 to be sure that cam 20 rotates with shaft 2.

In order to position the cam follower 22 on the shaft 8, a shaft 28 is provided which rotates in accordance with throttle setting and slides the cam follower 22 on element 24 through the operation of linkages 30 and 32. An additional control for the metering valve 18 is provided by a motor (not shown) which can rotate shaft 14 about its axis freely of rack 12 and rotate element 16 to vary the opening in ports 34 and 36 in accordance with variations in pressure input to the compressor.

It will be appreciated from the foregoing that the flow of fuel through line 38 will be governed in accordance with the speed of rotation of the engines, the throttle setting, the inlet temperature to the compressor, and the inlet pressure to the compressor. An additional limitation or boundary is set by the acceleration cam 4 which, for given instantaneous values of N, $P_T$, $T_T$, and $\delta_{TH}$, defines the maximum allowable translation of the valve stem and thus limits the maximum fuel flow. It will also be appreciated that further controls may be used to insure that the amount of fuel flow never decreases below a certain minimum while the simulated engine is on. A device, such as a mechanical stop (not illustrated) to prevent the complete closure of ports 34 and 36 may be added to serve this purpose.

Having set forth the general nature of the fuel control mechanism utilized in modern turbo prop aircraft, we turn now to the embodiment of the invention illustrated in FIGS. 2 and 3. The embodiment of the invention shown in FIG. 2 might be defined as a function generator which provides a voltage output which is a function of the compressor input temperature, throttle setting, and engine speed, and which represents the signal provided by the cam follower 22 of FIG. 1 to the shaft 8. Additional function generators are indicated in connection with FIG. 3 which simulate the position of shaft 8 which results from the position of cam follower 6 on three dimensional cam 4 of FIG. 1, and take into account the effect of taxiing on fuel consumption, the minimum fuel consumption possible with the particular engine, and the inlet pressure of air flowing into the compressor.

In order to generate the function provided by the circuit illustrated in FIG. 2, a plurality of input voltages and shaft positions are provided. Positive and negative potentials of selected magnitude are provided on terminals 50 and 52, respectively, of a potentiometer R–54 which is grounded at a mid point 54. The winding of potentiometer R–54 is such that the positioning of its wiper arm by shaft S–54 in accordance with the inlet temperature of the compressor $T_t$ represents the effect on fuel flow of said temperature. This voltage is representative of the effect of temperature and is supplied through a resistor R–56 to input terminal 58 of an amplifier A–58. A positive potential is applied on terminal 60 of a potentiometer R–60, the extreme terminals of which are grounded as illustrated. The wiper arm of potentiometer R–60 is positioned by shaft S–60 in accordance with the throttle setting of the engine. The potential appearing on the wiper arm represents the effect of throttle setting on fuel flow at some standard temperature and is applied through a resistor R–62 to the input terminal 58 of amplifier A–58. A constant term may be applied at terminal 64 through resistor R–64 to the input terminal 58 of amplifier A–58. Amplifier A–58 is a conventional summing amplifier with a feedback resistor R–58 and it provides an output potential proportional to the fuel flow which would be required if the throttle setting and temperature were the sole factors to be considered.

A function generator is shown at 66 which uses diodes to provide limits for various input potentials, and provides resistors which shape the slope of said potentials in a conventional manner. A first input is provided to the function generator 66, through a terminal 68, proportional to the potential X provided by amplifier A–58. Additional potentials are supplied through terminals 70, 72, 74, and 76, and through resistors R–70, R–71, R–72, R–74 and R–76 to the input terminal 78 of an amplifier A–80. The potential representing X supplied on terminal 68 and through resistor R–69 to input terminal 78 is limited by diode D–68 acting through resistors R–69, R–70, and R–71 and the negative bias at terminal 70. The potential supplied from terminal 72 through resistor R–72 is a function of engine speed N. The potentials applied on terminals 74 and 76 through resistors R–74 and R–76 serve as limiting potentials. The sum of the potentials applied at terminal 78 is provided as an output at terminal 82 of amplifier A–80 but is limited in its maximum amount by the action of diode D–80, resistors R–81 and R–82, and the negative bias at terminal 83. A conventional feedback resistor R–80 is provided for amplifier A–80. It will be recognized that the action of function generator 66 is fully explained by textbooks such as Korn & Korn on "Electronic Analog Computers," second edition, 1956.

An additional function generator is illustrated at 80a and 80b, where the portion labelled 80a is distinguished from portion 80b in that the first portion is a conventional limiter circuit whereas the second portion functions as a comparator. A plurality of input terminals 82a, 84 and 86a have fixed potentials applied thereon which are supplied through resistors R–82, R–84, and R–86 to the circuit 80a. The output potential from amplifier A–58 appearing on terminal 68 is applied through terminal 86 to the plate circuits of diodes D–82, and D–84 and through resistor R–88 to the input terminal 90 of amplifier A–90. The cathode at D–82 is connected to the negative bias on terminal 82a through resistor R–82 and to terminal 90 through resistor R–92. The cathode circuit of diode D–84 is connected to a negative bias on terminal 84 through resistor R–84 and to terminal 90 through resistor R–94. The function of the diodes D–82 and D–84 and their associated resistors is to generate a potential on terminal 90 which is a function of the voltage X representing the affects of throttle setting and temperature on fuel flow.

The amplifier A–90 in comparator 80b sums the potentials appearing at terminal 90 with the aid of feedback resistor R–90 and compares the potentials appearing on terminal 94 with the sum of potentials appearing on terminal 90 of the diode D–90 to provide an output at terminals 96 and 98 proportional to $W_f$, where $W_f$ represents the fuel flow in pounds per hour as thus far determined. The potential appearing on terminal 94 is of course an output of amplifier A–100 which with feedback resistor R–100 and input resistor R–98 amplifies the output at terminal 82 to the desired magnitude for presentation at terminal 94. Resistors R–93 and R–95 provide a biasing network for diode D–90. The effect of circuit 80b is to present an output at terminal 96 and terminal 98 which will be the greater of the potentials appearing at terminals 90 and 94.

The circuits in FIG. 3 represent additional function generators and comparison circuits which, together with those shown in FIG. 2, generate an output potential representative of the fuel flow to a prop jet engine as determined by the fuel regulator or fuel control mechanism of such an engine. The first of these function generators to be considered is designated as 102 in which diode circuits and one potentiometer are employed to provide an output which is a function of engine speed and compressor inlet temperature. The general operation of the circuits in 102 may be derived from textbook material such as that shown by Korn & Korn referred to above, but may be described generally as taking an input potential at terminal 104 which represents the speed of revolution of the engine and applying it by way of resistors R–104, R–106, R–108 and diodes D–106 and D–108 to the input terminal 110 of feedback amplifier A–110, the feedback circuits of which include resistor R–110, and diode D–110, resistor R–109, and resistor R–111. Negative biasing potentials are applied to the diodes from terminals 112, 114 and 116 through resistors R–112, R–114 and R–111 respectively. The output potential appearing on terminal 118, as shaped by the resistors and limited by the diodes, is applied across potentiometer R–120 to be multiplied by a function representing temperature when the shaft S–120 positions the wiper arm in accordance with temperature $T_T$. This output representing $N(T_T)$ is supplied through a resistor R–121 to the input terminal 122 of a summing amplifier A–122 having a feedback resistor R–122.

An additional function generator is shown at 134$a$ which generates an additional function of N which is not modified in any way by temperature $T_T$. This function generator potential is proportional to +N, applied at terminal 124 and suitable biasing voltages and applied at terminals 126, 128, 130 and 132. These potentials are applied through the resistors R–124, R–126, R–128, R–130, R–132, and through diodes D–126, D–128, D–130 and D–132 to input terminal 134 of amplifier A–134. Suitable additional connecting resistors R–136, R–138, R–140 and R–142 are provided to assure the proper operation of the function generator and to provide the correct slope for each portion of the curve. Resistor R–134 is shown as a feedback resistor for amplifier A–134 which provides the desired output to terminal 136 and through resistor R–136 to terminal 122. The voltages appearing through resistor R–121 and R–136 on terminal 122 are summed by action of amplifier A–122 to provide an output at terminal 138 which is proportional to the position assumed by cam follower 6 in FIG. 1.

An additional function generator of a different sort is shown at 140. The inputs to this function generator are applied at terminals 142, 144, 146, 148 and 150 to provide suitable constant potentials. The negative input on terminal 142 is applied to a terminal 154 and from that terminal through a resistor R–154 having a suitable scale factor to the input terminal 156 of amplifier A–156. Terminal 154 may also be connected through a contact 158 of a switch S–158 and a resistor R–160 to the input terminal 156. The switch S–158 may, however, be closed at times on a terminal 160 which is not connected. The potentials appearing on terminals 144 and 146 are applied across the ends of a potentiometer R–162, a midpoint of which is grounded, and the movable contact of which is controlled by an arm 164 which assumes a position proportional to the engine speed N. The output potential appearing on the wiper arm of potentiometer R–162 is applied at contact 166 of switch S–166. The potentials applied at terminals 148 and 150 are applied across potentiometer R–168, a midpoint of which is grounded. The wiper arm of potentiometer R–168 is positioned in accordance with engine speed N by a shaft 170, and the potential appearing on the wiper arm is applied on contact 172 of switch S–166. Terminal 174 of switch S–166 is connected to a terminal 176 of a switch S–178. Contact 180 of switch S–178 is connected through a resistor R–180 to the input terminal 156 of amplifier A–156, and terminal 176 of switch S–178 is connected through a resistor R–182 to said terminal 156. The contacts of switches S–158, S–166 and S–178 are closed as shown in their upper positions by a shaft S–184 while the engine is operating at a moderate speed to taxi the aircraft along the ground. When the shaft S–184 opens the contacts shown and closes the lower contacts the engine may operate at its low speed taxi, or non-operational speed during the warm up period. The output of amplifier A–156 is fed back for stabilization purposes through a resistor R–156 and is provided as an output a terminal 186.

The function generator shown at 190 operates as a comparator to compare the inputs appearing at terminals 98, 138 and 186. These potentials are applied to various terminals in the function generator 190 through resistors R–192, R–194 and R–196. The potential transmitted through resistor R–192 appears at input terminal 200 of amplifier A–200, with its feedback resistor R–200. The input potential applied through resistor R–194 appears at terminal 198 and through diode D–198 to the input terminal 200. The potential appearing through resistor R–196 appears at terminal 202 and through diode D–202 to terminal 200. Suitable resistors R–204 and R–206 are placed between the output terminal 208 of amplifier A–200 and terminals 198 and 202 respectively. The purpose of the function generator 190, as has previously been stated, is to make a comparison between voltages, in this case between those appearing in terminals 98, 138 and 186, and to determine the smallest of these magnitudes and to transmit it to output terminal 208.

In this simulator one additional comparison should be made, since it is possible that the simulator as thus far envisioned may transmit a potential indicating too small a flow of fuel. A circuit for preventing an error of this kind includes a terminal 152 to which a negative potential is applied representing the minimum possible flow of fuel with the particular fuel control apparatus being simulated. This potential may be labelled $W_{fmin}$ and is applied via line 210 through a resistance network made up of resistors R–210 and R–212 and through the cathode of diode D–210 to the output terminal 208. This diode circuit will compare the potential at 208 and that at 152 in a conventional way and transmit the larger of these two quantities to one terminal of a potentiometer R–214, the opposite terminal of which is grounded. The wiper arm of potentiometer R–214 is positioned by a shaft S–214 in accordance with the pressure $P_T$ appearing at the inlet side of the compressor to generate an output potential at terminal 216 which is proportional to the fuel flow under the simulated conditions. The output of terminal 216 may be applied directly to a meter such as 218 to yield a meter reading proportional to the desired quantities, or it may be applied to a servo motor through suitable amplifiers to generate a shaft position.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. In an aircraft engine simulator, means for determining the amount of fuel required for operation under various circumstances comprising means for admitting a plurality of signals representative of factors tending to limit the flow of fuel, means for comparing said signals to determine which is the smallest, means for transmitting the smallest of said signals, means for providing an additional signal representative of the minimum permissible flow of fuel, means for comparing said additional signal and said first determined smallest signal to determine which is the larger signal, and means for indicating said larger signal.

2. In an aircraft engine simulator means for accurately representing a fuel regulator comprising means for providing a plurality of signals representing the limits imposed on fuel flow by components of the regulator such as a setting cam, an acceleration cam and governor, means for comparing said signals, means for transmitting the smallest of said compared signals, means for providing a signal representing a minimum allowable flow of fuel, means for comparing said smallest signal and said signal representing said minimum allowable flow of fuel to determine which is the larger and means for transmitting the larger of said signals to an additional computing element, means for admitting a signal representing air inlet pressure to said additional computing element, means within said additional computing element for providing a further determination of fuel flow, and means coupled to said additional computing element for indicating said fuel flow.

3. In a turbo-prop engine simulator means for simulating fuel regulation including means for providing a first quantity proportional to possible fuel flow attributable to compressor inlet temperature, means for providing a second quantity proportional to possible fuel flow due to throttle setting, means for summing said first quantity and said second quantity to provide a third quantity, means for providing a fourth quantity proportional to the fuel flow needed to maintain engine speed, means for combining said third quantity and said fourth quantity to provide a fifth quantity, comparison means for comparing said third quantity and said fifth quantity to determine the smaller quantity, and means for transmitting the smaller quantity to means for indicating fuel consumption.

4. In an aircraft engine simulator means for accurately simulating the regulation of fuel flow comprising means for providing a plurality of signals representing the amount of fuel flow as determined by the regulator, a first one of said signals representing the amount of fuel flow attributable to throttle setting and inlet temperature as determined by a setting cam, a second one of said signals representing the amount of fuel flow attributable to throttle setting and inlet temperature and speed of revolution as determined by a cam, means for comparing said signals and means for transmitting the larger of said signals for further comparison with computed values.

5. In an aircraft engine simulator means for accurately simulating the regulation of fuel flow comprising means for providing a plurality of signals representing the amount of fuel flow imposed by components of the engine, a first signal representing the amount of fuel flow attributable to throttle setting and inlet temperature as determined by a setting cam, a second signal representing the amount of fuel flow attributable to throttle setting and inlet temperature and speed of revolution as determined by a cam, means for comparing said signals and means for transmitting the larger of said signals as a third signal, a fourth signal representing the amount of fuel flow attributable to conditions of acceleration as determined by a cam, a fifth signal representing the amount of fuel flow attributable to the requirements of high or low speed taxiing, means for comparing said third, fourth and fifth signals to determine which is smallest, and means for transmitting said smallest signal as a sixth signal, means for supplying a seventh signal representing the minimum flow of fuel possible in the operation of the aircraft engine, means for comparing said sixth and seventh signals to determine the larger, and means for transmitting said larger signal for further computations.

6. In an aircraft engine simulator means for accurately simulating the regulation of fuel flow comprising means for providing a plurality of signals representing the amount of fuel flow imposed by components of a regulator, a first one of said signals representing the amount of fuel flow as determined by a setting cam, a second one of said signals representing the amount of fuel flow as determined by an acceleration cam, and a third one of said signals representing the amount of fuel flow as determined by a governor, means for comparing said signals, and means for transmitting the smallest of said compared signals to fuel flow indicating means.

7. In an aircraft engine simulator means for accurately simulating the regulation of fuel flow comprising a plurality of means for providing a plurality of signals representing the amount of fuel flow imposed by components of a regulator, a first one of said means providing signals representing the amount of fuel flow as determined by a setting cam, a second one of said means providing signals representing the amount of fuel flow as determined by an accelerating cam, and a third one of said means providing signals representing the amount of fuel flow as determined by a governor, means for comparing said signals, and means for transmitting the smallest of said compared signals to fuel consumption indicating means.

8. In an aircraft engine simulator means for accurately representing the amount of fuel flow comprising a plurality of means for providing a plurality of signals representing the amount of fuel flow imposed by components of a regulator, a first one of said means providing signals representing the amount of fuel flow as determined by a setting cam, a second one of said means providing signals representing the amount of fuel flow as determined by an acceleration cam, and a third one of said means providing signals representing the amount of fuel flow as determined by a governor, means for comparing said three signals to determine the smallest, means for transmitting the smallest of said three signals as a fourth signal, means for providing a fifth signal representing a minimum allowable flow of fuel, means for comparing said fourth signal and said fifth signal to determine which is the larger and means for transmitting the larger of said signals to means for indicating fuel flow.

9. In an aircraft engine simulator means for accurately representing the amount of fuel flow comprising means for providing a plurality of signals representing the amount of fuel flow imposed by components of the engine, a first one of said signals representing the amount of fuel flow as determined by a setting cam, a second one of said signals representing the amount of fuel flow as determined by an acceleration cam, and a third one of said signals representing the amount of fuel flow as determined by a governor, means for comparing said three signals to determine the smallest, means for transmitting the smallest of said three signals as a fourth signal, means for providing a fifth signal representing a minimum allowable flow of fuel, means for comparing said fourth signal and said fifth signal to determine which is the larger and means for transmitting the larger of said signals to means for indicating fuel consumption.

10. In an aircraft engine simulator means for simulating the regulation of fuel flow comprising a plurality of function generators, a first one of said function generators providing an output potential representing the output of a scheduling cam, a second one of said function generators providing an output potential representing the output of an acceleration cam, means for comparing said outputs to determine the smaller, and means for transmitting said smaller output to means for performing additional computations.

11. In an aircraft engine simulator means for simulating the regulation of fuel flow comprising a plurality of function generators, a first one of said function generators providing an output potential representing the output of a scheduling cam, a second one of said function generators providing an output potential representing the output of an acceleration cam, a third one of said function generators providing an output potential representing the output of a high or low speed taxi relay, means for comparing said outputs to determine the smallest, and means for transmitting said smallest output to means for indicating the rate of fuel flow.

12. In an aircraft engine simulator means for simulating the regulation of fuel flow comprising a plurality of function generators, a first one of said function generators providing an output potential representing the output of a scheduling cam, a second one of said function generators providing an output potential representing the output of an acceleration cam, a third one of said function generators providing an output potential representing the output of a high or low speed taxi relay, means for comparing said outputs to determine the smallest and to provide said smallest as a new potential, means for transmitting said new potential to further comparison means, means for providing an additional potential representing the minimum possible flow of fuel to said further comparison means, said further comparison means selecting between said new potential and said additional potential and transmitting the larger to means for indicating the rate of fuel flow.

References Cited in the file of this patent

UNITED STATES PATENTS

| | | |
|---|---|---|
| 2,798,308 | Stern et al. | July 9, 1957 |
| 2,882,615 | Dawson | Apr. 21, 1959 |

OTHER REFERENCES

Electronic Analog Computers (text), Korn & Korn, 2nd ed., McGraw Hill Book Co., 1956.